Nov. 19, 1968   H. J. A. M. JACOBS ET AL   3,412,319
SCR IGNITRON CONTROL CIRCUIT HAVING MEANS FOR CONTROLLING THE
SCR AS A FUNCTION OF THE IGNITRON ANODE VOLTAGE
Filed Feb. 14, 1966   2 Sheets-Sheet 1

INVENTORS
HENRI J.A.M. JACOBS
FRANS H. DE JONG
AUKE VLAGSMA
BY
Frank R. Trifari
AGENT

PROGRAMMER

United States Patent Office 3,412,319
Patented Nov. 19, 1968

3,412,319
SCR IGNITRON CONTROL CIRCUIT HAVING MEANS FOR CONTROLLING THE SCR AS A FUNCTION OF THE IGNITRON ANODE VOLTAGE
Henri Joseph Antonius Marie Jacobs, Frans Hendrik De Jong, and Auke Vlagsma, Emmasingel, Eindhoven, Netherlands, assignors to North American Philips Company, Inc., New York, N.Y., a corporation of Delaware
Filed Feb. 14, 1966, Ser. No. 527,378
Claims priority, application Netherlands, Feb. 27, 1965, 6502528
17 Claims. (Cl. 323—24)

ABSTRACT OF THE DISCLOSURE

A control circuit for a pair of ignitrons connected in inverse parallel between an AC voltage source and an inductive load. The control circuit includes an SCR connected to the ignitor electrodes of the ignitrons and a first switching element for supplying control pulses to the gate electrode of the SCR. The control circuit also includes a second switching element arranged to control the switching of the first switching element as a function of the anode voltage of the ignitrons. The second switching element inhibits the switching of the first switching element until the ignitron anode-cathode voltage becomes positive.

---

This invention relates to a control circuit for controlling the energy supplied to a load from an AC source of voltage. More particularly, the invention relates to a control circuit including a controlled rectifier for alternately rendering conducting two rectifying circuits connected in parallel and in opposition through which a load, for example, a variable and at least partly inductive load, is energized by an alternating voltage source.

Such arrangements are known, for example, from U.S. Patent 3,363,168, in which the controlled rectifier used is a single controlled semiconductor rectifier which is connected in the forward direction between the anode and the igniting electrode of each of two ignitrons connected in inverse parallel. To permit the instant of ignition of each ignitron to be determined as accurately as possible, the controlled rectifier of such an arrangement must be rendered conducting by a pulse having a steep leading edge.

The current flowing through the circuit between the control electrode and the common electrode of a controlled rectifier, when said circuit is driven in the forward direction, is fairly large, so that the control of such a rectifier by comparatively long pulses required a large control energy. This disadvantage is even more severe, if a plurality of rectifiers is controlled each by own comparatively long pulses, and the control circuit then also becomes complicated and expensive. On the other hand, in view of the energy applied to the control electrode of the rectifier and largely dissipated in it, the control pulse must be of as short duration as possible and hence be a voltage peak.

In an arrangement of the kind mentioned in the preamble, this method of making the controlled rectifier periodically conducting may involve difficulties.

If, for example, the effective value of the current supplied to the load is controlled by varying the phase of the control voltage peaks with respect to the alternating supply voltage, i.e. by a so-called firing delay, it may happen that, in order to allow the passage of a maximum current, the phase of the control pulses is adjusted too far in the leading direction. Each short control pulse occurs at an instant when the anode-cathode voltage of a rectifier of the rectifying circuit to be rendered conducting has not yet become positive, so that it cannot render the controlled rectifier conducting and the rectifying circuit remains cut of.

If the effective value of the current supplied to the load is maximum or substantially maximum (substantially no firing delay) and if the load is suddenly varied so that the current flowing through it commences to lag relative to its previous phase, the control pulses can again commence to lead, at least temporarily, relative to the instants when the anode-cathode voltage of a rectifier of one of the rectifying circuits to be rendered conducting again becomes positive. As a result, once again this rectifying circuit is not regularly rendered conducting. This may happen, for example, if the load comprises the primary winding of a transformer of a resistance-welding machine. Upon an increase of the load resistance in the secondary circuit of said transformer, the load current decreases and the load assumes a more inductive character (the cos $\varphi$ becomes smaller).

An object of the invention is to provide an arrangement of the kind mentioned in the preamble in which the controlled rectifier is rendered conducting by short control pulses and in which the described disadvantages of this method of rendering the controlled rectifier periodically conducting are avoided.

The arrangement according to the invention is characterized in that it comprises a direct-voltage source, a load circuit for this voltage source, a first controlled switch for connecting this load circuit to the voltage source, a network for deriving a control pulse from the voltage step which appears across the load circuit when it is switched on and off and for applying said control pulse in the forward direction between the control electrode and the common electrode of the controlled rectifier, and a second switch controlled by a control voltage derived from the voltage developed across the rectifying circuits and by which the switching on and off of the load circuit is prevented at least until the anode of a rectifier of the rectifying circuit to be rendered conducting has become positive relative to its cathode.

In this connection it should be noted that it is known per se, for example, from pages 87 and 88 and FIGURE 7,5 and FIGURE 7,6 of the "Controlled Rectifier Manual" published in 1960 by the General Electric Company, to render a controlled semiconductor rectifier periodically conducting by means of short control voltage peaks derived, by means of a differentiating coupling circuit, from comparatively long pulses having steep leading edges generated by an appropriate pulse source.

From the foregoing it will be evident that the arrangement according to the invention is very advantageous if the load that is energized by means of the rectifying circuits is variable and reactive, more particularly, if it is at least in part inductive.

In order that the invention may be readily carried into effect, it will now be described in detail, by way of example, with reference to the accompanying diagrammatic drawings, in which.

Figure 1:
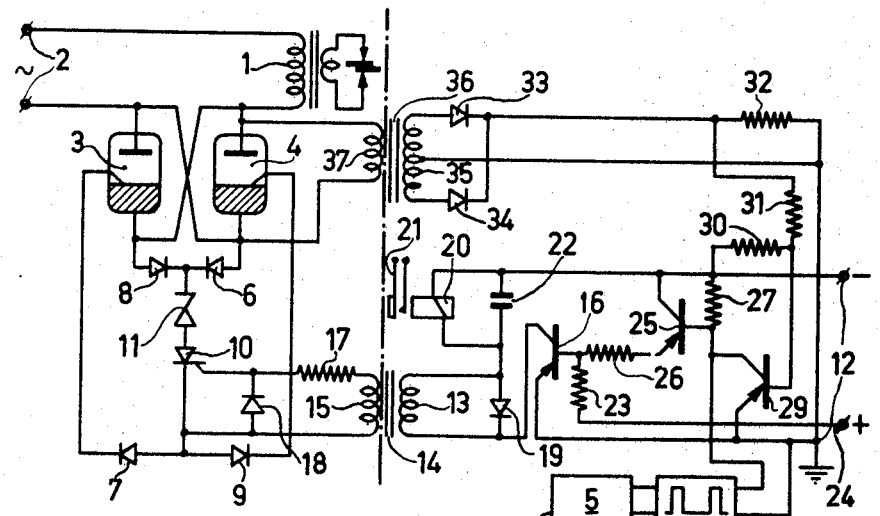
FIGURE 1 shows the circuit diagram of a first embodiment of the arrangement according to the invention.

As shown in the diagram of FIGURE 1, a load 1 that is variable and inductive at least in part, such as the primary winding of a transformer of a resistance-welding machine, is energized from an alternating voltage source 2 through two ignitrons 3 and 4 connected in parallel opposition, each comprising a rectifying circuit and which may be ignited alternately, for example under control of a programming device 5. This is affected by means of a controlled rectifier connected in the forward direction between the anode and the igniting electrode of each ignitron. As shown and previously described in U.S. Patent 3,363,168 the anode-igniting-electrode-circuit of each ignitron also includes two gate diodes 6, 7 and 8, 9, respectively, so that both ignitrons 3 and 4 may be ignited by means of one common controlled rectifier, shown as a controlled semiconductor rectifier 10 connected in the forward direction. As described in the co-pending U.S. application Ser. No. 395,384, filed Sept .10, 1964, a Zener diode 11 having a Zener voltage higher than the anode-cathode are voltage of the ignitrons 3 and 4 is connected in series with the controlled semiconductor rectifier 10 and ensures the extinction of the ignitron arc in each ignitron as soon as the anode-cathode arc in the ignitron has been ignited.

The controlled semiconductor rectifier 10 and the Zener diode 11 could be replaced by a thyratron, or by another controlled rectifier. Also each of the ignitrons 3 and 4 could be ignited by means of a separate controlled rectifier, in which event the diodes 6, 7, 8 and 9 could naturally be dispensed with.

The arrangement for igniting the ignitrons 3 and 4 comprises, in addition to the controlled rectifier 10 together with the Zener diode 11 and the gate diodes 6, 7, 8 and 9, a voltage source 12 shown as a direct-voltage source with its positive terminal connected to ground. A load circuit for this voltage source comprises substantially the primary winding 13 of a transformer 14 having a secondary winding 15, and a first control switch formed by the emitter-collector path of a pnp-type transistor 16. The transformer 14 constitutes, together with a current-limiting resistor 17 and a diode 18 connected in the backward direction between the control electrode and the emitter of the controlled rectifier 10, a network by which a control pulse for making the controlled rectifier 10 conducting is derived from the voltage step set up across the primary winding 13 when it is switched into circuit. By means of said network, a short positive voltage peak is derived from each switch-on voltage step. The positive voltage peak is suitable to make the controlled rectifier 10 conduct, whereas the negative voltage peaks which appear when the winding 13 is switched out of circuit are suppressed by the diode 18. A second suppressing diode 19 is connected in parallel with the primary winding 13 of the transformer 14, in order to suppress and protect transistor 16 from the counter-voltage pulse set up at the said winding upon switching-off transistor 16.

A winding 20 for energizing a signalling and/or pilot relay having contacts 21 is connected in series with the primary winding 13 of transformer 14 and is parallel with a smoothing capacitor 22.

The emitter of transistor 16 is connected directly to ground and its base is connected through a resistor 23 to the positive terminal of a polarisation voltage source 24. The negative terminal of this voltage source is connected to ground. The base of transistor 16 is also connected to the emitter of an emitter-follower transistor 25 of the pnp-type through a second resistor 26.

The collector of the transistor 25 is directly connected to the negative terminal of the voltage source 12 and its base is connected to this terminal through a resistor 27. The base of transistor 25 is directly connected to one output terminal of a square-wave voltage generator 28, controlled by the programming device 5, and to the collector of a third transistor 29, likewise of the pnp-type, which fulfills the function of a second controlled switch. The emitter of transistor 29 is connected to ground as is also the second output terminal of the square-wave voltage generator 28.

The base of transistor 29 is connected to the tapping on a voltage divider comprising two ohmic resistors 30 and 31 connected between the negative terminal of the voltage source 12 and one end of a load resistor 32 of a full-wave rectifier comprising two diodes 33 and 34. The cathodes of diodes 33 and 34 are connected to the common point of the load resistor 32 and the voltage divider 30 and 31. The other end of the resistor 32 is connected to ground, as is also the centre tapping on the secondary winding 35 of a transformer 36. The end terminals of winding 35 are connected to the anodes of the diodes 33 and 34.

Lastly, the primary winding 37 of transformer 36 is connected in parallel with the ignitrons 3 and 4, connected in parallel opposition.

Figure 2:
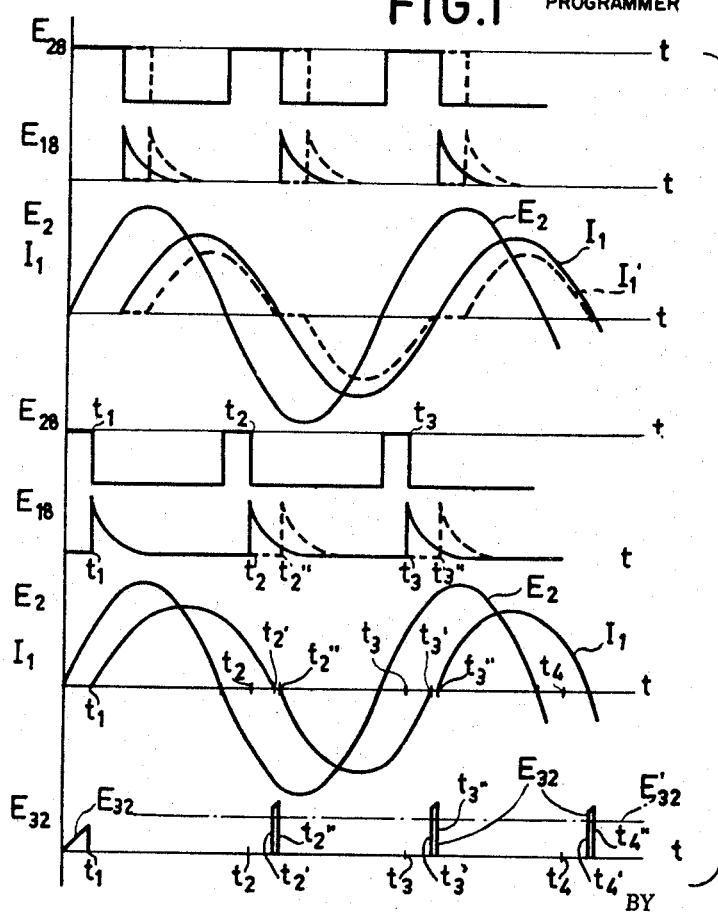
FIGURE 2 shows current and voltage vs. time diagrams which serve to explain the operation of the embodiment of FIGURE 1.

As shown on the upper line of FIGURE 2, the square-wave voltage generator 28 provides, under control of the programming device 5, negative voltage pulses $E_{28}$ synchronized with the AC voltage $E_2$ (third line of FIGURE 2) from the supply source 2, that is to say one pulse per half period. Each pulse $E_{28}$ terminates with the corresponding half period of $E_2$ and begins at an adjustable instant during the same half period, in order to control the current flowing through the load 1 by firing delay. For example, pulses $E_{28}$ corresponding to a firing delay angle of 60° (and 240°) are shown in full lines, whereas $E_{28}$ pulses corresponding to a firing delay angle of 90° (and 270°) are shown in broken lines.

Let it first be assumed that the transistor 29 is absent or invariably cut-off. During each negative pulse $E_{28}$, the transistor 25 becomes conducting and its emitter provides an amplified current to the base of transistor 16 which is thus released and likewise becomes conducting. The collector current of transistor 16 thus varies in the rhythm of the negative voltage $E_{28}$ between the zero value and a value $I_{16}$ which is determined substantially by the voltage from the source 12 and by the resistance $R_{13}+R_{20}$ of the collector circuit of the transistor 16. Positive control pulses $E_{18}$ across the diode 18 are derived from the current jumps from 0 to $I_{16}$ by means of the transformers 13, 14, 15 and the resistor 17, whereas the negative pulses which appear across the primary winding 13 upon each current jump from $I_{16}$ to 0 are suppressed by the diode 18 and/or by the diode 19.

The controlled semiconductor rectifier 10 is made conducting by each positive control pulse $E_{18}$, provided that at this instant a sufficiently high voltage exists across the ignitrons 3 and 4 connected in parallel opposition. Said voltage must at this instant be higher than the sum of the threshold voltages of the diodes 6 or 8 and 7 or 9, of the minimum anode-cathode igniting voltage of the rectifier 10, and of the Zener voltage of the diode 11, the total being, for example, equal to 20 volts.

The third line of FIGURE 2 shows, in addition to the voltage $E_2$ from the voltage source 2, the current $I_1$ which flows through the ignitrons 3 and 4 connected in parallel opposition when the ignitrons are regularly ignited by the control pulses $E_{18}$. The load 1 is assumed to be so strongly inductive that the current $I_1$ is lagging by, for example, 60° relative to the voltage $E_2$: cos $\varphi=0.5$. The full line shows the current $I_1$ for a firing delay angle $\alpha$ equal to the current-lagging angle $\varphi=60°$ and the broken line shows the variation of the current $I'_1$ for a firing delay angle $\alpha=90°$, and hence greater than the current-lagging angle $\varphi=60°$.

As may be concluded from the first three lines of FIGURE 2, the arrangement operates satisfactorily as long as $\alpha$ is greater than, or at least equal to, $\varphi$. The four subsequent lines of this figure relate to the case in which α was chosen incorrectly and/or that $\varphi$ exceeded α, for example, due to decrease of the load. During the first half period of a series during which the ignitrons 3 and 4 must be ignited in accordance with a programme determined by the programming device 5 or, in the case of variation in the cos $\varphi$ of the load 1, during the first half cycle after a decrease of the cos $\varphi$ such that α has become smaller than $\varphi$, the corresponding ignitron, for example ignitron 3, is normally ignited due to the release of the controlled rectifier 10, which is made conducting by the control pulse $E_{18}$ at the instant $t_1'$, for example, with a firing delay angle α of 30°. However, the cos $\varphi$ of the lead 1 is equal to 0.5, corresponding to a phase-lagging angle $\varphi$ of 60° and hence greater than α. The ignitron 3 thus extinguishes only about 60° after the zero passage of the voltage $E_2$ at an instant $t_2'$. However the control pulse by which the controlled rectifier 10 would again have to be made conducting occurred at an earlier instant, $t_2$, corresponding to the selected firing delay angle α of 30°, and is not substantially terminated. At the instant $t_2$ the ignitron 3 is still conducting and the voltage effective across the series-combination of the diode 8, the Zener diode 11, the controlled rectifier 10 and the diode 9 is still in the reverse direction and cannot cause a current flow via said series-combination.

Consequently, the ignitron 4 cannot be ignited at the instant $t_2$ and is not ignited any more thereafter. At the instant $t_3$ the ignitron 3 is ignited again and a pulsating direct current flows via the ignitrons 3 and 4 connected in parallel opposition, through the load 1 in a direction determined by the ignitron first igniting 3 or 4, instead of the desired alternating current controlled by firing delay. This is naturally very objectionable, especially if the load 1 is formed by the primary winding of a load transformer having a core of ferromagnetic material, for example, a transformer of a resistance-welding machine. Such a core is strongly magnetized by the pulsating direct current and driven into its saturation region so that the impedance of the load greatly decreases, resulting in heavy overloading. The load transformer is thus damaged within a short period of time.

In the arrangement according to the invention, the switching-on (or the switching-off) of the load circuits 13, 19, 20, 22 of the first controlled switch 16 is prevented until the anode of the ignitron to be ignited, for example, ignitron 4, has become positive with respect to its cathode. The transistor 29 is normally greatly conducting indeed, its base being biased in the forward direction by the voltage drop across the resistors 31 and 32 of the voltage divider 30 to 32. As long as transistor 29 is conducting it suppresses the square-wave voltage pulses from the generator 28 so that the transistors 25 and 16 remain cut-off.

The transistor 29 is not cut-off until the instant when the backward voltage drop set up across the resistor 32 by the transformed and rectified voltage across the ignitrons 3 and 4 neutralizes the forward voltage across the base tapping 30–31 of the voltage divider 30–31, so that the negative voltage of the correspondfing square-wave pulse from the generator 28 becomes active on the base of the transistor 25. This happens only after the voltage at the anode of the ignitron 4 has become positive and the corresponding rectified voltage $E_{32}$ across resistor 32 has become higher than the threshold value $E'_{32}$ determined by the voltage divider 30–32. Due to the transistor 29 remaining conducting, the control pulses following after the first control pulse $E_{18}$ are thus delayed to the instants $t_2''$, $t_3''$, etc., shortly after the instants $t_2'$, $t_3'$, etc., at which the preceding conducting ignitrons 3 and 4 extinguishes. The firing delay angle α is thus determined by the front, and hence the width of the square-wave voltage pulses provided by the generator 28, with the sole restriction that it cannot be made smaller than the phase angle $\varphi$ of the load. As soon as an ignitron 3 and 4 is ignited, the voltage across the primary winding 37 of the transformer 36 and the forward voltage across the resistor 32 disappear so that the transistor 29 immediately becomes conducting again and cuts off the transistors 25 and 16. If an ignitron to be ignited is not properly ignited, or is not ignited at all, the transistor 29 remains cut off from the instant when the other ignitron has extinguished to the instant when the first-mentioned ignitron is ignited, or the other ignitron is ignited again. The period of conduction of the transistor 16 is lengthened correspondingly so that the relay 20 is energized and its contact 21 is closed. This contact may be used to switch off the poorly igniting or no-ignited ignitron, or the complete equipment, and/or to switch-on a defect signalling device, for example, a signal lamp.

The control pulse applied to the control electrode of the controlled rectifier 10 is normally terminated very shortly after the ignitron 3 or 4 has been ignited, due to the transistor 29 becoming conducting again and to the transistors 25 and 16 being cut-off. Since the time which elapses between the occurrence of the leading edge of this control pulse and the establishment of the arc between the anode and the cathode of the ignitron to be ignited is very short (at most 100μ sec.), the duration of the control pulse is also very short and hence the energy supplied to the control electrode of the controlled rectifier is small, which is desirable especially when using one or more controlled semiconductor rectifiers. On the other hand, each control pulse $E_{18}$ begins only at the instant when ignition of the ignitron 3 or 4 to be ignited has become possible, so that the controlled rectifier 10 is periodically made conducting by a signal having an amplitude which is invariably the same and equal to the peak value of the voltage pulses $E_{18}$ across the diode 18. This peak voltage in turn is proportional to the amplitude of the current jumps of the collector current through the transistor 16.

Figure 3:
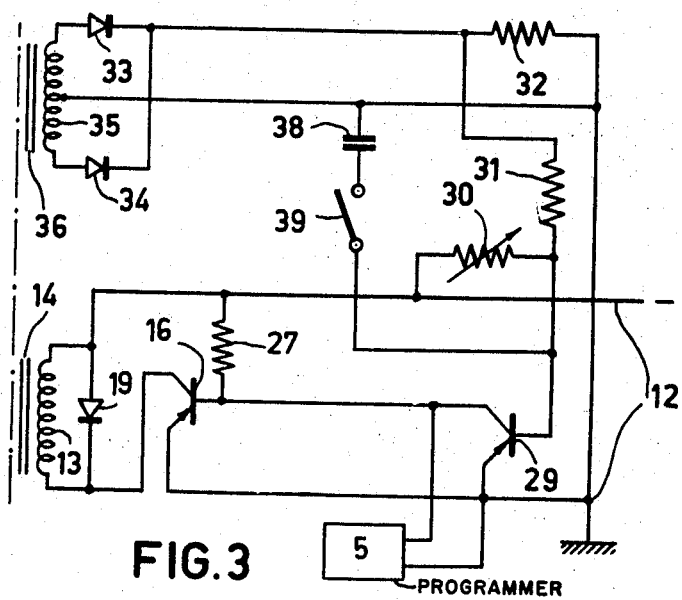
FIG. 3 shows the circuit diagram of part of a second embodiment.

The second embodiment, which is shown in part in FIGURE 3, is greatly simplified with respect to the first embodiment just described. The part shown can replace the portion to the right of the dot-and-dash line of FIGURE 1.

A first simplification is the omission of the emitter follower transistor 25 with its coupling resistors 23 and 26 and of the source 24 of backward polarisation voltage. The transistor 16 is directly cut-off due to the conduction of the emitter-collector path of transistor 29 and/or of a control circuit connected in parallel therewith.

A second simplification is of a more fundamental nature. The square-wave voltage generator 28 is absent and the programming device 5 normally closes the control circuit connected in parallel with the emitter-collector path of transistor 29. Only when this circuit is interrupted can the arrangement operate and ignite alternately the ignitrons 3 and 4. The firing delay angle α is then varied by varying the threshold value $E'_{32}$ (FIGURE 2) of the backward voltage drop across the resistor 32 by which the transistor 29 is cut off. This can be accomplished by variation of one or more of the resistors 30 to 32, for example, resistor 30, and/or by time delay of the increase in the cut-off voltage produced by the voltage $E_{32}$ at the base of transistor 29, for example, by means of a capacitor 38. Capacitor 38 may be switched out of circuit by means of switch 39. Thus, there is no longer direct adjustment of the firing delay angle α, but rather, an adjustment of the difference angle α—$\varphi$ between the desired firing delay angle α and the phase angle $\varphi$ corresponding to the cos $\varphi$ of the load 1, or the delay time $\Delta t$ between the instant of the ignition, for example, $t_2''$, and the instant, for example $t_2$, at which the preceding ignitron 3 or 4, for example ignitron 3, has extinguished. As a matter of fact, α can never become smaller than $\varphi$, or the instant of ignition, for example $t_2''$, can never occur before the instant of extinction, for example $t_2$.

The advantage of saving the generator 28 is offset by the disadvantage that, for any adjustment selected, the firing delay angle α, upon variations in the cos φ of the load 1, increases and decreases by the same angular difference as the angle φ corresponding to this cos φ so that the effective load current, upon decrease in the cos φ of the load, decreases even more strongly than in the first embodiment of FIGURE 1, which is often undesirable.

Figure 4:
FIGURES 4 and 5 show the circuit diagrams of other examples of two rectifying circuits connected in parallel opposition and which may be made alternately conducting by means of an arrangement according to the invention.
Figure 4:
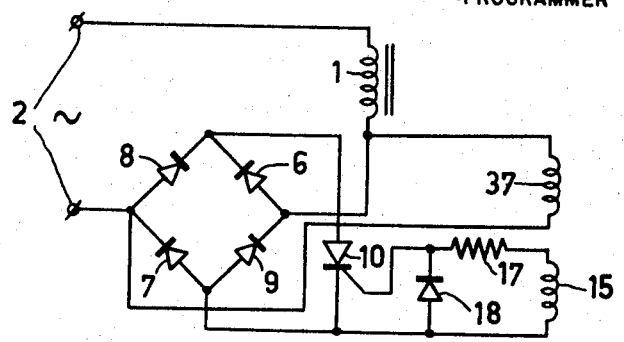
Figure 5:
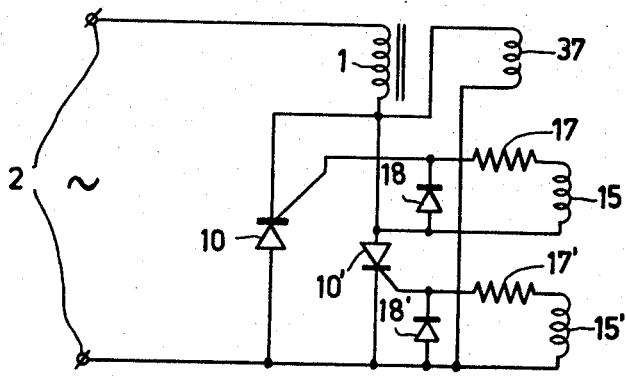

Finally, FIGURES 4 and 5 show further examples of two rectifying circuits connected in parallel opposition and which may be made alternately conducting by means of an arrangement according to the invention, for example, by means of the portion of the circuit of FIGURE 1 which is shown to the right of the dot-and-dash line.

In FIGURE 4, one of the rectifying circuits connected in parallel opposition comprises a rectifier 6, the controlled rectifier 10 and a further rectifier 7. The other rectifying circuit comprises a rectifier 8, the controlled rectifier 10 and a fourth rectifier 9.

In FIGURE 5, one of the rectifying circuits connected in parallel opposition comprises the controlled semi-conductor rectifier 10 and the other a second controlled semi-conductor rectifier 10'. To permit the controlled rectifier 10' to be made also conducting, the transformer 13, 14, 15 of FIGURES 1 or 3 has a second secondary winding 15' to which the control electrode of said rectifier is connected by means of a resistor 17'. In addition, a diode 18' bridges the emitter- control electrode path of said rectifier.

What is claimed is:

1. A circuit arrangement for controlling the current supplied to a load from a source of alternating voltage comprising, two rectifying circuits connected in inverse parallel between the load and the voltage source and each including a controlled rectifier, a third controlled rectifier arranged to control said controlled rectifiers, a direct-voltage source, a load circuit for the direct voltage source, a first controlled switch for connecting the load circuit to the direct voltage source, a network for deriving a control pulse from the voltage step which appears across the load circuit when it is switched on and off and for applying said control pulse in the forward direction to the control electrode of the third controlled rectifier, and a second switch controlled by a control voltage derived from the voltage developed across the rectifying circuits and arranged to prevent the switching of the load circuit at least until the anode of the controlled rectifier of the rectifying circuit to be rendered conducting has become positive relative to its cathode.

2. An arrangement as claimed in claim 1 wherein the direct voltage source is a source of substantially constant direct voltage so that the amplitude of the voltage step appearing across the load circuit when it is switched on and off is independent of the alternating supply voltage.

3. An arrangement as claimed in claim 1 wherein the load circuit comprises the primary winding of a transformer which forms part of the network producing the control pulse, and means connecting the secondary winding of said transformer in the control electrode circuit of the third controlled rectifier, said transformer deriving a control pulse having a steep leading edge from the voltage step appearing across the load circuit.

4. An arrangement as claimed in claim 1 wherein said third controlled rectifier is a controlled semiconductor rectifier, said first and second switches comprising a first and a second transistor, a diode connected with opposite polarity between the control electrode and the cathode of said third controlled rectifier, said control pulse being derived from the voltage step which appears across the load circuit when it is switched on whereas the pulse which appears when the load circuit is switched off is suppressed by said diode.

5. An arrangement as claimed in claim 1 further comprising a full wave rectifier responsive to the voltage developed across the rectifying circuits for producing said control voltage for controlling the second switch.

6. An arrangement as claimed in claim 1 further comprising a source of square-wave voltage pulses for controlling said first switch, the operating frequency thereof being equal to twice the frequency of the alternating voltage source, and means for coupling the second switch to the first switch so as to prevent the first switch from being switched on and off before the anode of the controlled rectifier of the rectifying circuit to be rendered conducting has become positive with respect to its cathode.

7. An arrangement as claimed in claim 6, in which the current flowing through the load is controlled by varying the firing angle of the controlled rectifiers of said rectifying circuits, said square wave voltage source including means for varying the phase of the leading edge of the control pulse by varying the relationship of the pulse width to the pulse interval of the square-wave voltage, said second switch being operative to prevent the occurrence of this leading edge at a firing angle that is earlier than the load angle.

8. An arrangement as claimed in claim 1 wherein said first switch is controlled solely by the second switch, so that it switches off or on when a controlled rectifier of one of the rectifying circuits becomes non-conducting and switches on or off again when the second switch is actuated again by the positive anode voltage of the controlled rectifier of the other rectifying circuit.

9. An arrangement as claimed in claim 6, in which the current flowing through the load is controlled by varying the firing angle of the controlled rectifiers of said rectifying circuits, and means for varying the amplitude of the control voltage thereby to vary the phase of the leading edge of the control pulse.

10. An arrangement as claimed in claim 8, in which the current flowing through the load is controlled by varying the firing angle of the controlled rectifiers of said rectifying circuits, and means for varying the amplitude of the control voltage thereby to vary the phase of the leading edge of the control pulse.

11. An arrangement as claimed in claim 1 wherein the second switch is a controlled element biased to be normally conducting and which is cut off by the control voltage as soon as the anode-cathode voltage of the rectifying circuit to be rendered conducting is positive and exceeds a threshold value.

12. An arrangement as claimed in claim 6 wherein the current flowing in the load is controlled by varying the firing angle of the controlled rectifiers of said rectifying circuits, and means for delaying the occurrence of said control voltage thereby to vary the phase of the leading edge of the control pulse.

13. An arrangement as claimed in claim 8 wherein the current flowing in the load is controlled by varying the firing angle of the controlled rectifiers of said rectifying circuits, and means for delaying the occurrence of said control voltage thereby to vary the phase of the leading edge of the control pulse.

14. A system for controlling the current supplied to a variable reactive load from a source of AC voltage comprising, a pair of controlled rectifiers each having a control electrode for initiating current flow therein, means connecting said pair of rectifiers in inverse-parallel between the source and the load for alternately passing load current, a third controlled rectifier connected in circuit with the control electrodes of said pair of controlled rectifiers for alternately switching said pair of rectifiers from a nonconductive to a conductive state, a source of direct voltage, a load circuit for said direct voltage source, a first controlled switching element interconnecting the load circuit and the direct voltage source, means for switching said first first switching element to produce a step voltage across said load circuit, a network for deriving a control pulse from said step voltage and coupling same in the forward direction to the control electrode of said third controlled rectifier, a second controlled switching element coupled to said first switching element so as to control the switching thereof, means responsive to the voltage across said pair of controlled rectifiers for producing a control voltage determined thereby, and means for coupling said control voltage to the control electrode of said second switching element so that said second switching element controls the switching of said first switching element as a function of the voltage across said pair of controlled rectifiers.

15. A system as described in claim 14 wherein said reactive load exhibits a net inductive reactance so that the load current lags said AC voltage by an angle $\phi$, said switching means being synchronized with said source of AC voltage and being adjustable to control the switching of said first switching element relative to said AC voltage thereby to adjust the firing angle $\alpha$ of said pair of controlled rectifiers.

16. A system as described in claim 15 wherein said control voltage producing means and said second switching element are controlled by the anode voltages of said pair of controlled rectifiers so as to delay the switching of said first switching element for a given time period whenever the firing angle $\alpha$ is less than the load angle $\phi$.

17. A system as described in claim 14 further comprising means for biasing said second switching element so that it is normally conducting, and said control voltage producing means includes current rectifying means for deriving a DC control voltage, said DC control voltage being coupled to the second switching element so as to cut-off said second switching element whenever the anode-cathode voltage of the non-conductive one of said pair of controlled rectifiers exceeds a given threshold level.

References Cited

UNITED STATES PATENTS

| | | | |
|---|---|---|---|
| 3,193,728 | 7/1965 | Skirpan | 315—251 |
| 3,229,161 | 1/1966 | Anger | 323—24 X |
| 3,249,801 | 5/1966 | Kirk et al. | 315—251 X |
| 3,290,555 | 12/1966 | Davis | 315—251 X |
| 3,312,890 | 4/1967 | Suel | 323—24 |

LEE T. HIX, *Primary Examiner.*

A. D. PELLINEN, *Assistant Examiner.*